H. J. GAGE.
Wagon-Bolster Spring.
No. 210,516. Patented Dec. 3, 1878.
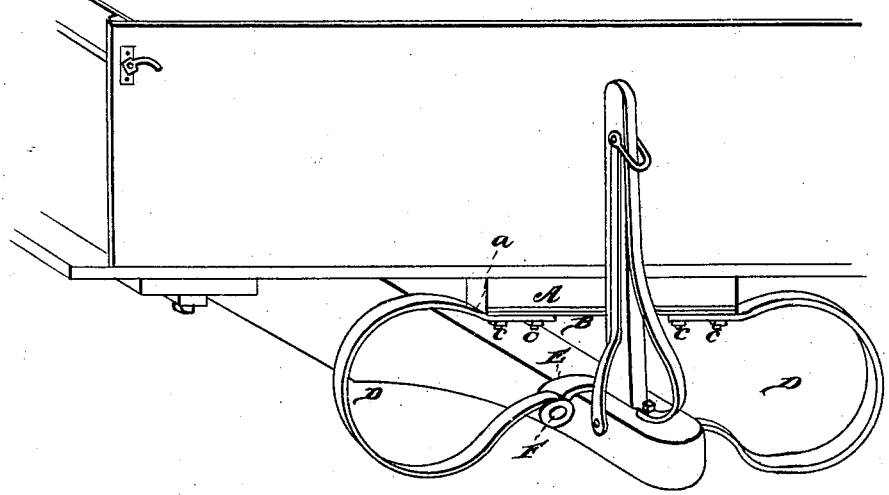
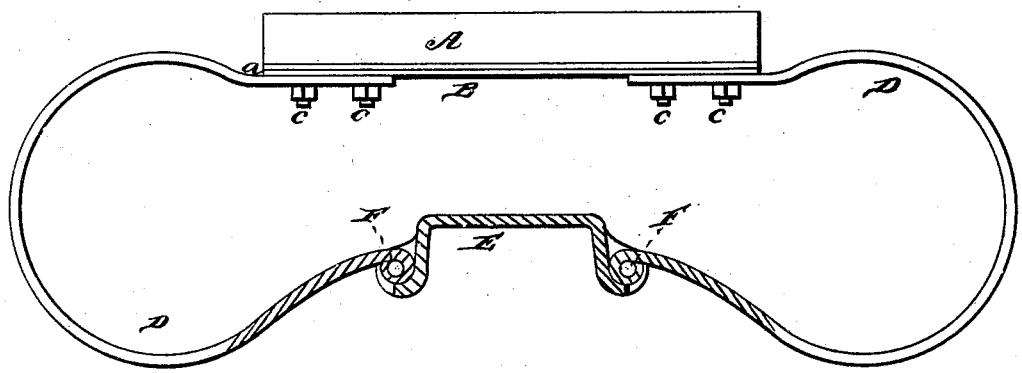
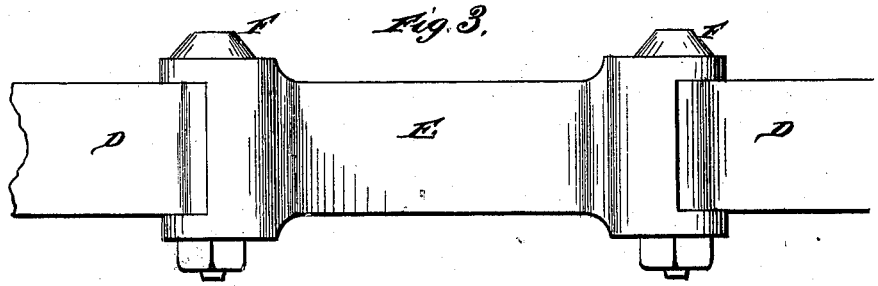

UNITED STATES PATENT OFFICE.

HIRAM J. GAGE, OF KALAMAZOO, MICHIGAN.

IMPROVEMENT IN WAGON-BOLSTER SPRINGS.

Specification forming part of Letters Patent No. 210,516, dated December 3, 1878; application filed August 3, 1878.

*To all whom it may concern:*

Be it known that I, HIRAM J. GAGE, of Kalamazoo, in the county of Kalamazoo and State of Michigan, have invented a new and valuable Improvement in Wagon-Bolster Springs; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective of my wagon-bolster spring. Fig. 2 is a longitudinal central sectional view of the same. Fig. 3 is a detail view.

The nature of my invention consists in the construction and arrangement of bolster-springs to be used on farm or other wagons, as will be hereinafter more fully set forth.

The annexed drawings, to which reference is made, fully illustrate my invention.

D D represent two curved springs, made nearly in circular form, and contracting and expanding on a true circle, or nearly so. The lower ends of these springs are, by bolts or rivets F F passing through a hinge-head and eye, connected with the ends of a metal yoke or plate, E. The connection of the springs with this yoke or plate may be made by loops, links, hooks, or other equivalent mechanical devices, whereby a joint will be formed at the junction of said yoke and springs. The yoke or plate E rests upon the upper side of the bolster, as shown in Fig. 1, and drops against or near the sides of the bolster. The upper ends of the springs D are, by bolts or rivets *c c*, connected to the ends of a metal plate, B, upon which rests a wood support, A, for the wagon-box. A cushion, *a*, of rubber or leather, is placed between the ends of the springs D and the metal plate B, said cushion running either the entire length of the plate, as shown, or only part of the way at each end.

By this construction I obtain an easy-acting and elastic bolster-spring, connected with the bolster by joints, which renders the spring more easy and free in its action, and lessens the liability of breaking by heavy loads. The springs D D can also be made more strong and perfect than if they were made in one piece.

I am aware that carriage-springs formed of a single strip of suitable material, having a center shaped to conform to the bolster, and two leaves extending one from each side of the central portion horizontally, and thence curving upward, over, and back above the horizontal parts, have been used.

I am aware, also, that coil-springs secured in brackets forming bearings for the shafts of the springs, which latter are connected in pairs by coupling bars and links, have been employed as carriage-springs, and these devices are not sought to be covered in this specification.

What I claim as new, and desire to secure by Letters Patent, is—

1. A wagon-bolster spring consisting of separate and independent springs, connected to the wagon-bolster by joints at their lower ends, and their upper ends having the wagon-box support fastened to them, substantially as herein set forth.

2. The combination of the springs D D, the yoke E, jointed to and forming connection between the lower ends of the springs, the plate B, forming connection between their upper ends, and the support A, substantially as and for the purpose herein set forth.

In testimony that I claim the above I have hereunto subscribed my name in the presence of two witnesses.

HIRAM J. GAGE.

Witnesses:
WILLIAM H. TUTHILL,
GEO. J. SPAULDING.